United States Patent [19]
Eto et al.

[11] Patent Number: 4,858,134
[45] Date of Patent: Aug. 15, 1989

[54] DEVICE FOR CONTROLLING STEERING FORCE IN POWER STEERING APPARATUS

[75] Inventors: Kunihiko Eto, Toyota; Shiro Takeuchi, Aichi; Yutaka Mori, Okazaki; Shigeo Tanooka, Okazaki; Kazumasa Kodama, Okazaki; Tsutomu Matsumoto, Okazaki, all of Japan

[73] Assignee: Toyoda Koki Kabushiki Kaisha, Kariya, Japan

[21] Appl. No.: 98,185

[22] Filed: Sep. 18, 1987

[30] Foreign Application Priority Data

Sep. 24, 1986 [JP] Japan ................ 61-225235

[51] Int. Cl.⁴ .............................. B62D 6/00
[52] U.S. Cl. ............... 364/424.05; 180/79.1; 180/142
[58] Field of Search ........... 364/424.05; 74/388 PS; 180/79.1, 141–143

[56] References Cited

U.S. PATENT DOCUMENTS

| 4,506,909 | 3/1985 | Nakashima et al. | 280/707 |
| 4,574,905 | 3/1986 | Asano et al. | 180/142 |
| 4,593,358 | 6/1986 | Takeshima et al. | 364/424 |
| 4,602,695 | 7/1986 | Takeshima et al. | 180/143 |
| 4,626,994 | 12/1986 | Yabe et al. | 364/424 |
| 4,651,290 | 3/1987 | Masaki et al. | 364/550 |
| 4,674,587 | 6/1987 | Suzuki et al. | 180/79.1 |
| 4,751,649 | 6/1988 | Eto et al. | 180/142 |
| 4,763,745 | 8/1988 | Eto et al. | 180/143 |

FOREIGN PATENT DOCUMENTS

| 60-18455 | 1/1985 | Japan . |
| 61-220971 | 10/1986 | Japan . |
| 61-275060 | 12/1986 | Japan . |
| 62-55267 | 3/1987 | Japan . |
| 62-149558 | 7/1987 | Japan . |
| 62-210168 | 9/1987 | Japan . |

Primary Examiner—Gary Chin
Attorney, Agent, or Firm—Oblon, Spivak, McClelland, Maier & Neustadt

[57] ABSTRACT

There is disclosed a device for controlling steering force in a power steering apparatus having an electromagnetic control valve according to road and driving conditions. The device includes a car speed sensor, a steering angle sensor, first arithmetic means, second arithmetic means, correcting means, control current arithmetic means and controlling means. The first arithmetic means computes a driving condition index by using car speed information. The second arithmetic means computes a road condition index by using steering angle signals. The correcting means converts the driving condition index into a correction driving condition index which takes any one of several stepwise-varied values. The control current arithmetic means computes an output control current value applied to electromagnetic control valve by the controlling means. The device further includes means for detecting lateral acceleration utilized for controlling the steering force.

11 Claims, 17 Drawing Sheets

DEVICE FOR CONTROLLING STEERING FORCE IN POWER STEERING APPARATUS

BACKGROUND OF THE INVENTION

1. Field of the Invention

The present invention relates to a device for controlling steering force in a power steering apparatus wherein steering characteristics are varied by controlling assist force by means of an electronic control unit in accordance with conditions under which an automobile travels.

2. Discussion of the Prior Art

In the power steering apparatus of this kind, the travelling conditions of the automobile are generally detected on the basis of a car speed. The assist force is so controlled on the basis of the detected results that this force becomes large in a range of lower velocities but small in a range of higher velocities. For instance, as disclosed in Japanese Patent Laid-Open No. 9574/1984, a well-known power steering apparatus is arranged such that a plurality of control characteristics between the car speed and a rotational frequency of an oil pump are prepared, and one of these control characteristics is selected, depending on the conditions of streets of cities or towns and mountain roads. This type of apparatus is capable of varying the characteristics existing between manual steering torque and steering output torque by changing the assist force in accordance with not only a difference between the car speeds but also the difference between the road conditions.

However, there arise some problems in which the travelling condition of the automobile varies according to a feeling and a character of the driver in addition to the car speed and the road conditions, i.e., the travelling condition depends on the manner in which the driver drives the car aggressively or moderately, and the steering force suited to the operating condition determined by the driver can not be obtained in the prior art.

SUMMARY OF THE INVENTION

In order to obviate the above described problems, the present inventors of this invention have proposed a method of determining the steering force taking the driving conditions as well as the road conditions into consideration, which is disclosed in U.S. patent application Ser. No. 06/946,050 now U.S. Pat. No. 4,773,448. In the previously proposed invention, however, a driving condition index which exhibits the driving condition is calculated in the form of a numerical value on the basis of the car speed, and hence the steering force often varies in proportion to frequent changes in car speed according to traffic situations in which the automobile travels. As a result, an unnatural feeling is given to the driver.

Accordingly, it is a primary object of the present invention to provide a device for controlling steering force designed for a power steering apparatus which is capable of controlling the steering force in accordance with not only the road conditions but also the driving conditions, and particularly of eliminating influences of oft-produced changes in car speed which are to be exerted directly on the steering force.

To this end, according to one aspect of the invention, there is provided a device for controlling steering force in a power steering apparatus which is capable of correcting stepwise the driving condition index to any one of several numerical values, the driving condition index being calculated on the basis of a plurality of updated car speed information for exhibiting the driving conditions.

According to another aspect of the invention, there is provided a device for controlling steering force in a power steering apparatus which is capable of controlling the steering force in accordance with lateral acceleration in addition to the road and driving conditions.

To be specific, the steering force controlling device designed for the power steering apparatus is arranged such that the driving condition indices each exhibiting a driving condition are computed on the basis of the values of car speed transmitted from a car speed sensor or the plurality of update information on the car speed, and road condition indices each exhibiting a road condition are computed on the basis of a plurality of update steering angle signals transmitted from a steering angle sensor. The correcting means makes a decision to specify one of classified ranges within which the driving condition index falls and then converts the driving condition index into a correction driving condition index prescribed for the specified range of driving condition index. Hence, the above-described correction driving condition index indicates any one of several numerical values determined corresponding to the classified ranges. An output current value is computed on the basis of the correction driving condition index and the road condition index, and an electric current having the thus obtained current value is applied to an electromagnetic control valve for controlling the characteristics of the power steering apparatus.

With this arrangement, it is feasible to control the steering force more elaborately in accordance with the conditions under which the automobile travels, because the steering force is set to a value suited to not only the road conditions but also the driving conditions. Furthermore, since the correction driving condition index exhibits any one of only several numerical values, it is possible to prevent the frequent changes in steering characteristics even under such a condition that the car speed is often changed. In consequence, a relatively stable feeling is imparted to the driver when the car speed changes.

BRIEF DESCRIPTION OF THE ACCOMPANYING DRAWINGS

Other objects and aspects of the invention will become apparent from the following description of embodiments with reference to the accompanying drawings in which.

Figure 3A:
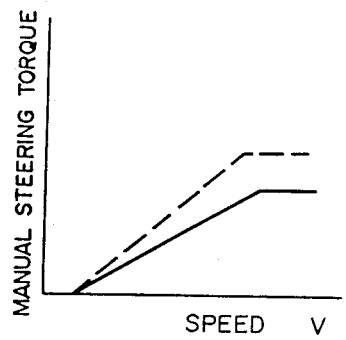
Figure 3B:
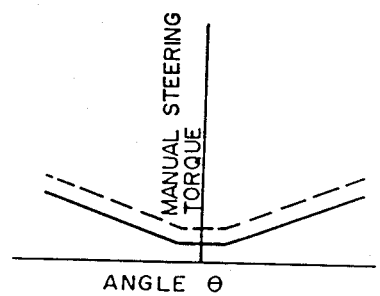
Figure 6A:
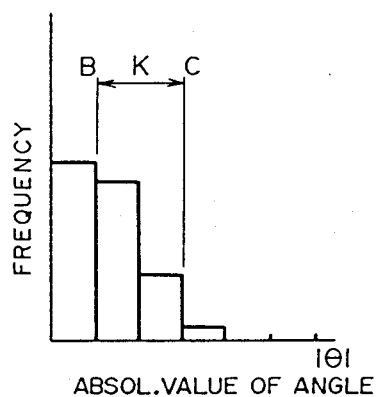
Figure 6B:
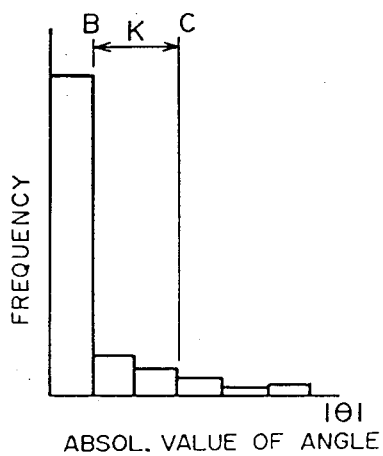
Figure 7:
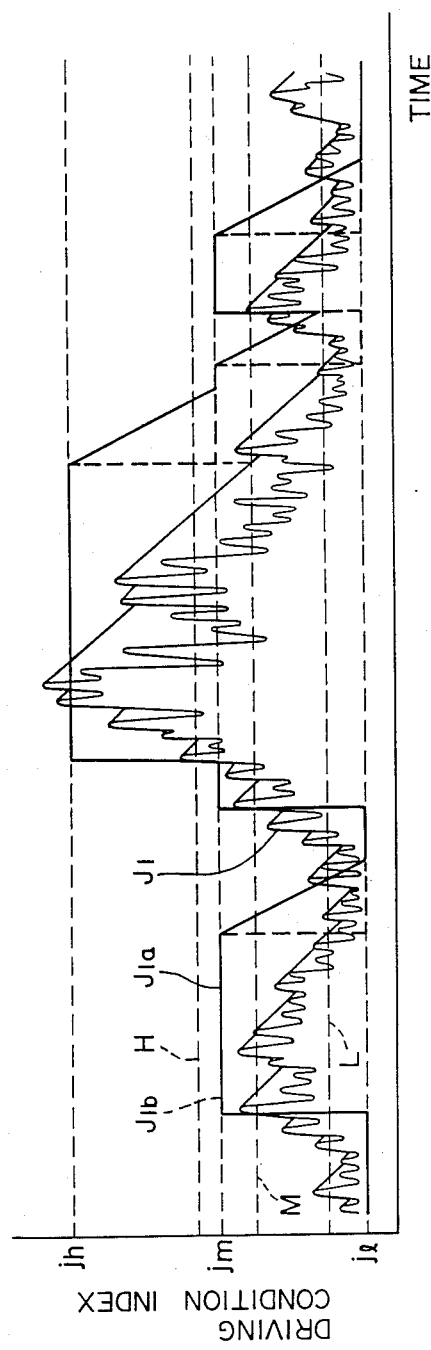
Figure 8:
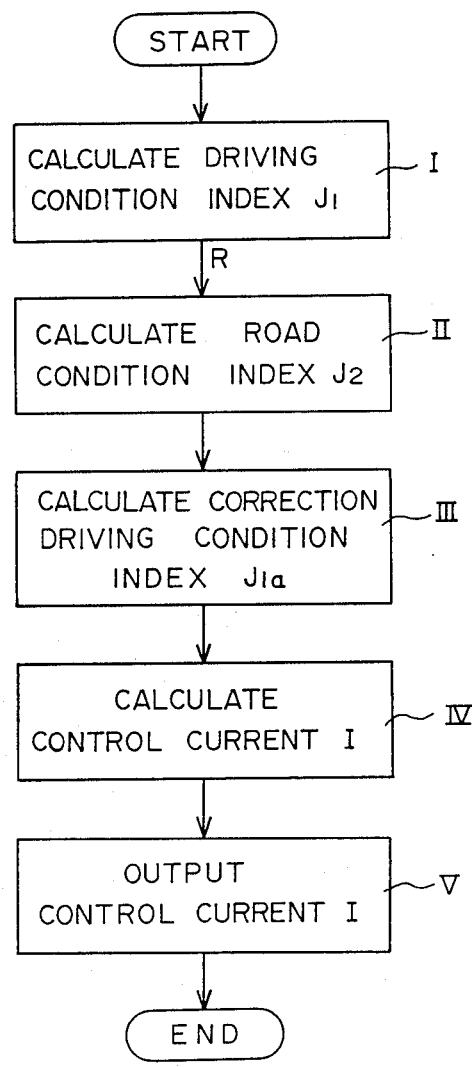
Figure 9:
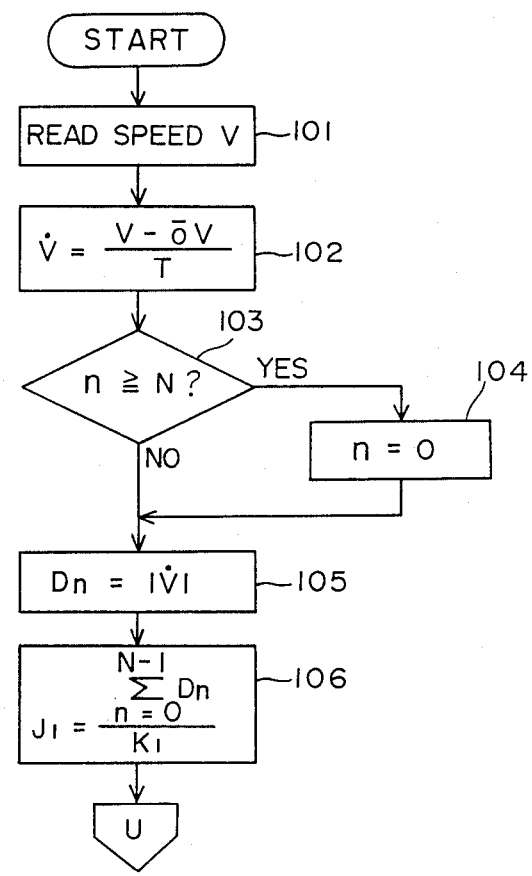
Figure 10:
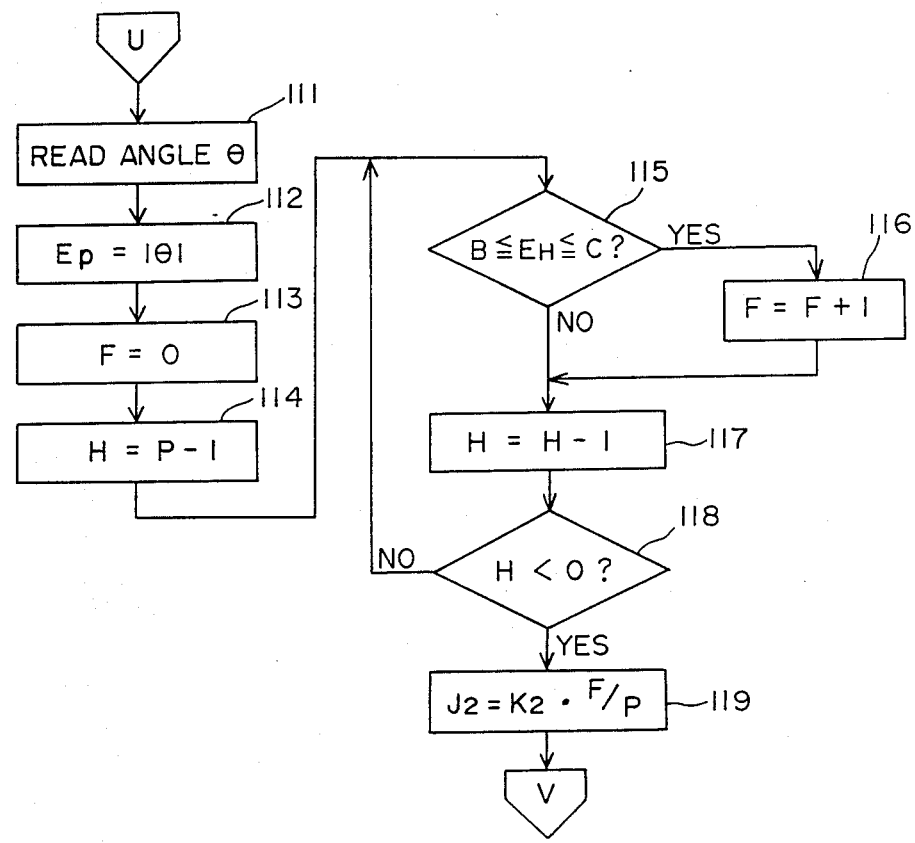
Figure 11A:
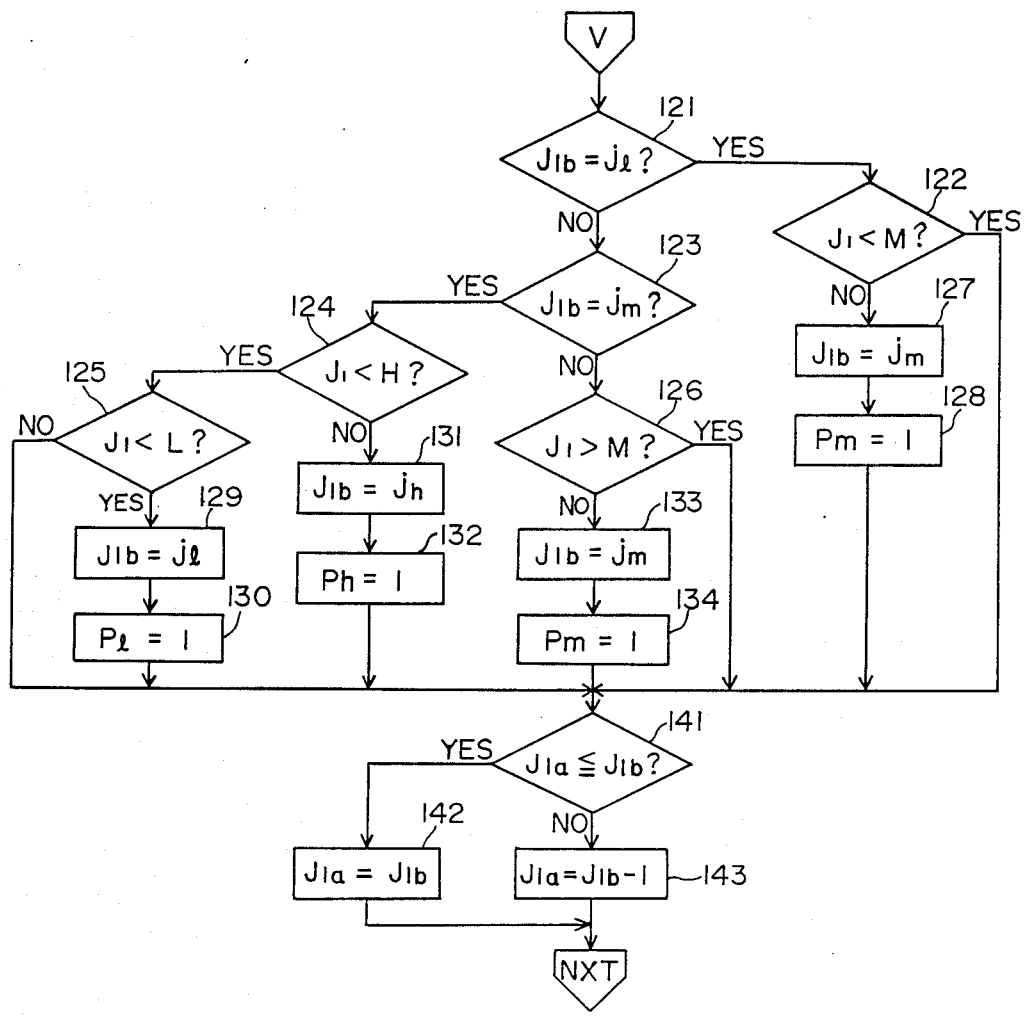
Figure 12:
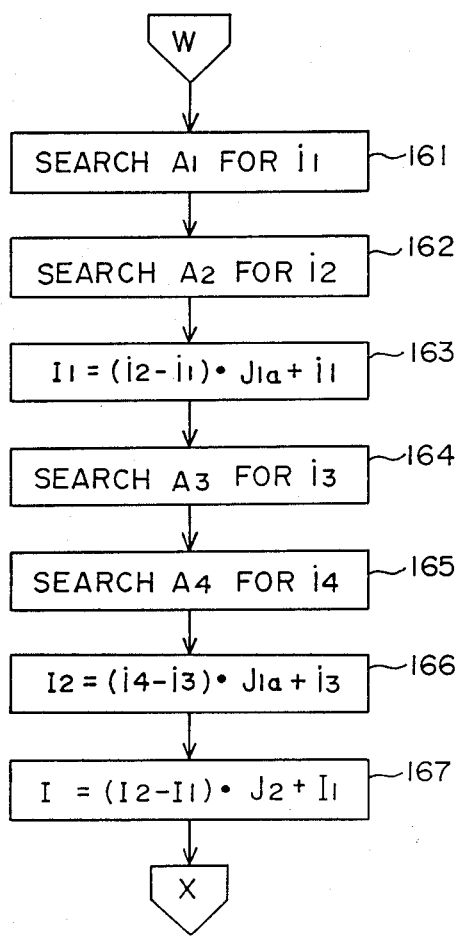
Figure 13:
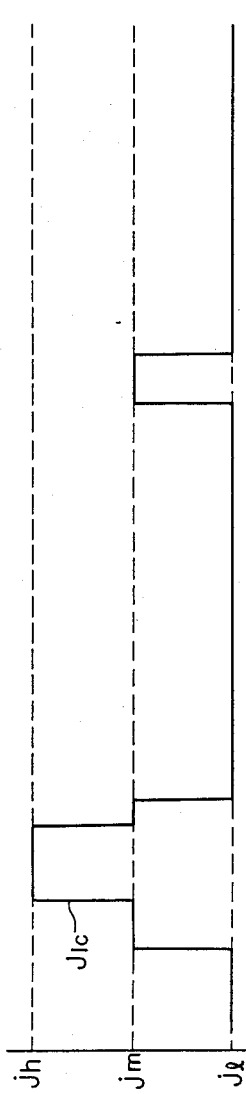
Figure 13:
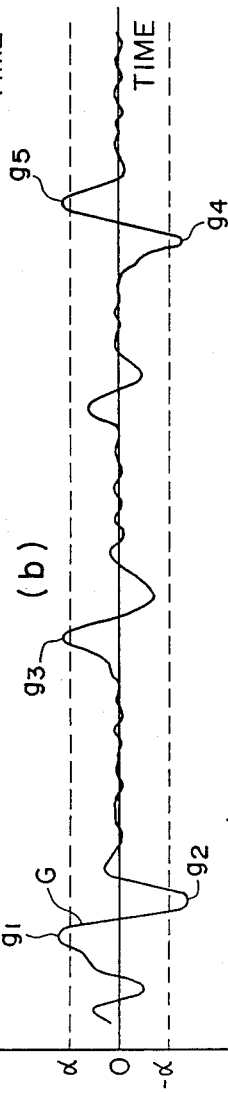
Figure 13:
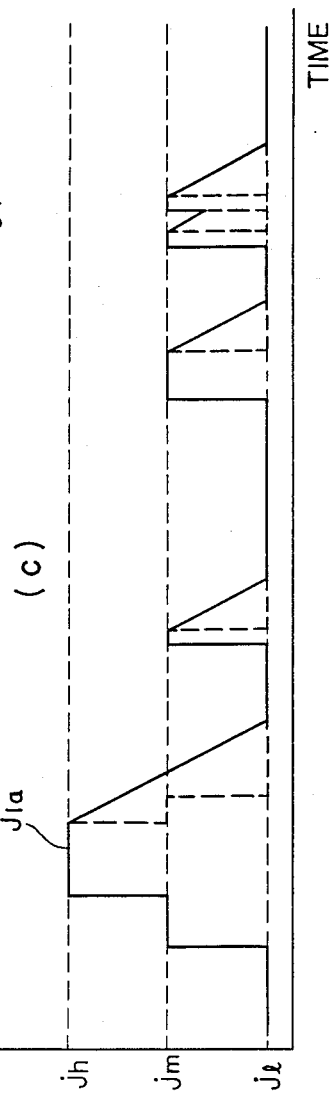
Figure 14:
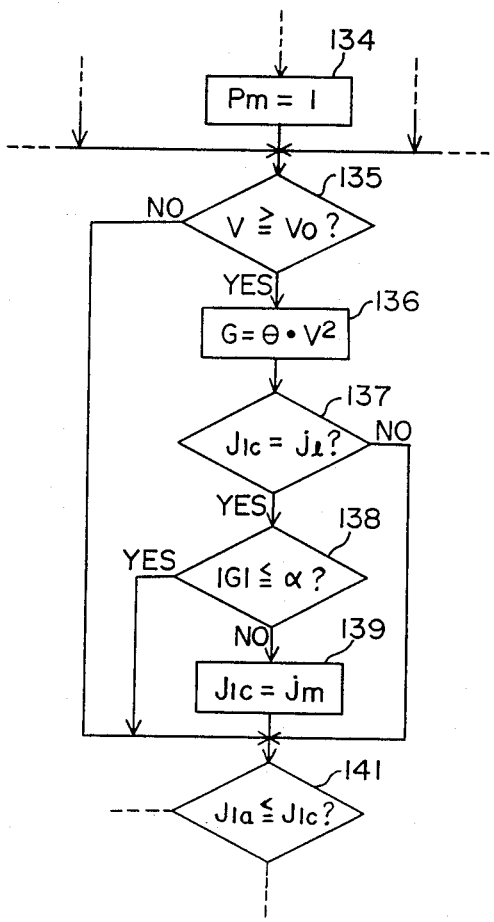
Figure 15:
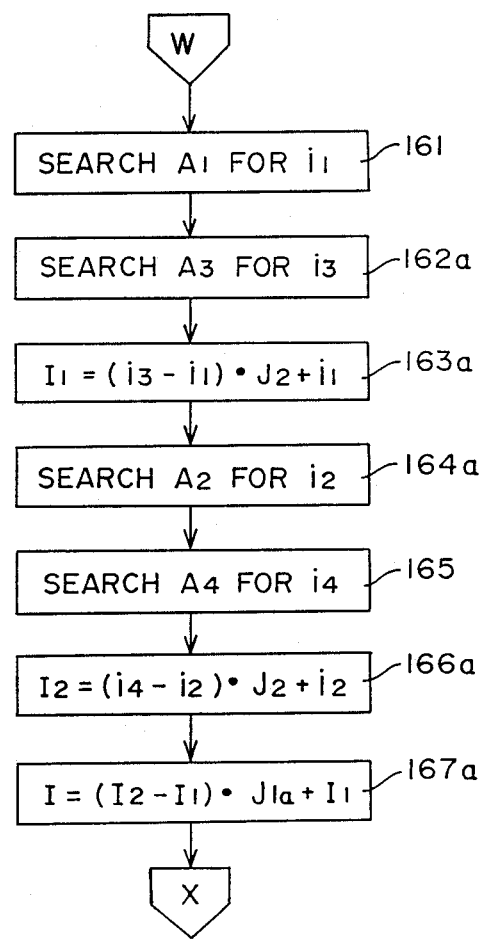

FIGS. 3(A) and 3(B) are graphic charts each showing variations in manual operation torque with respect to a car speed and a steering angle;

FIGS. 4(A) through 4(D) are graphic charts each showing a control current characteristic map in which control current values corresponding to the steering angles and the car speeds under four travelling conditions are determined;

FIGS. 5(A) through 5(F) are graphic charts each showing variations in car speed, acceleration and absolute value of the acceleration under two driving conditions;

FIGS. 6(A) and 6(B) are histograms each showing a frequency distribution of the absolute values of the steering angle under two road conditions;

FIG. 7 is a graphic chart illustrating variations in correction driving condition index;

FIG. 8 is a flowchart schematically showing a system program executed by a microprocessor;

FIG. 9 is a flowchart fully showing a step I of the program of FIG. 8;

FIG. 10 is a flowchart fully showing a step II of the program of FIG. 8;

FIGS. 11(A) and 11(B) are flowcharts in combination showing a step III of the program of FIG. 8;

FIG. 12 is a flowchart showing a step IV of the program of FIG. 8;

FIG. 13 is a graphic chart showing variations in middle correction index, lateral acceleration and correction driving condition index with respect to the time in a second embodiment of the present invention;

FIG. 14 is a flowchart showing a part of the flowchart employed in the second embodiment of the present invention, particularly showing an added part to be inserted just before a step 141 of FIG. 11(A);

FIG. 15 is a flowchart employed instead of the flowchart of FIG. 12; and

Figure 1:
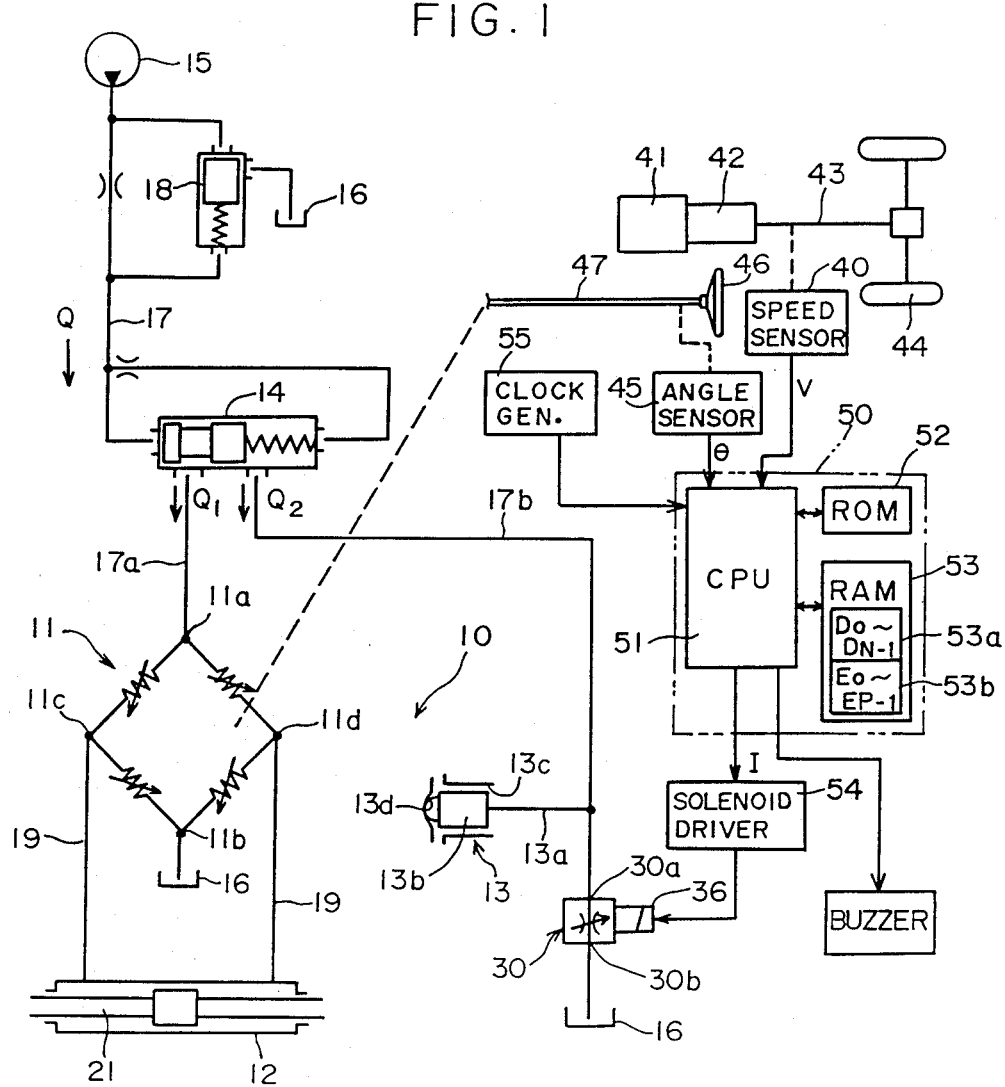
FIG. 1 is a block diagram schematically illustrating a power steering system equipped with a device for controlling steering force according to the present invention.
Figure 18:
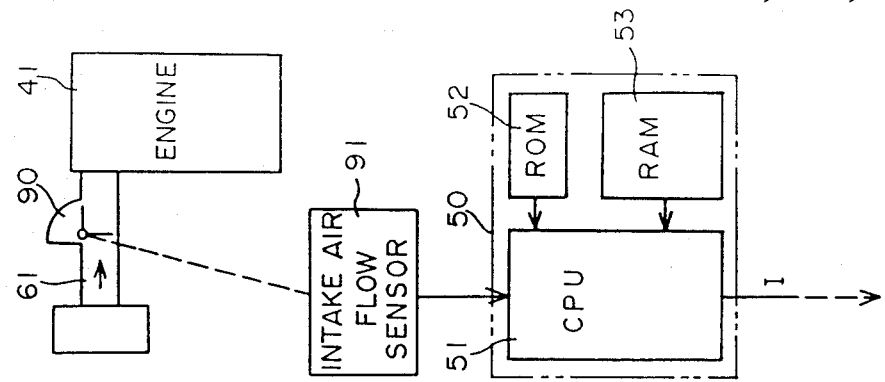
Figure 17:
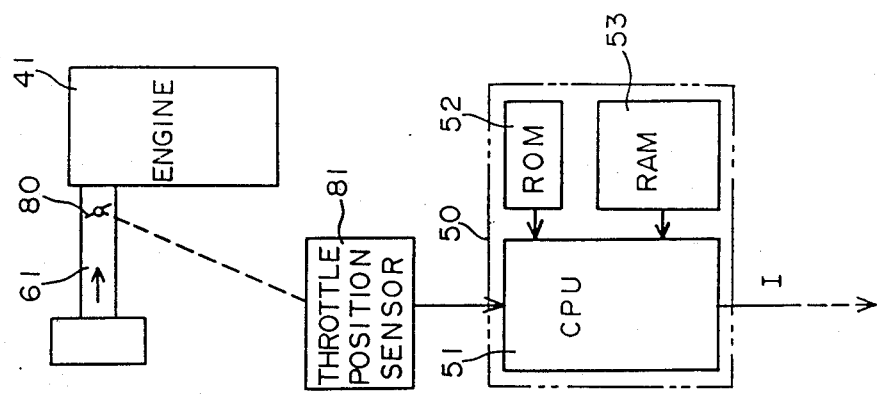
Figure 16:
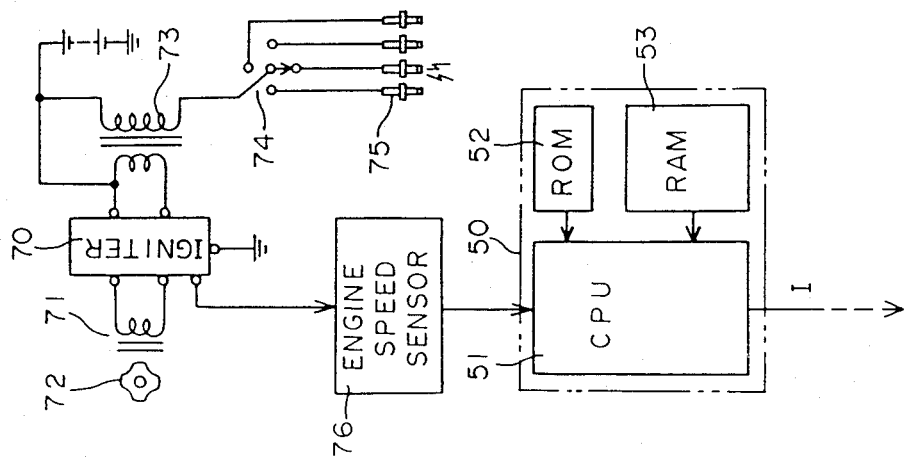

FIGS. 16 through 18 are block diagrams in combination showing first, second and third variant forms of means for detecting information on the car speed which is utilized in place of a car speed sensor depicted in FIG. 1.

DETAILED DESCRIPTION OF THE PREFERRED EMBODIMENTS

Figure 2:
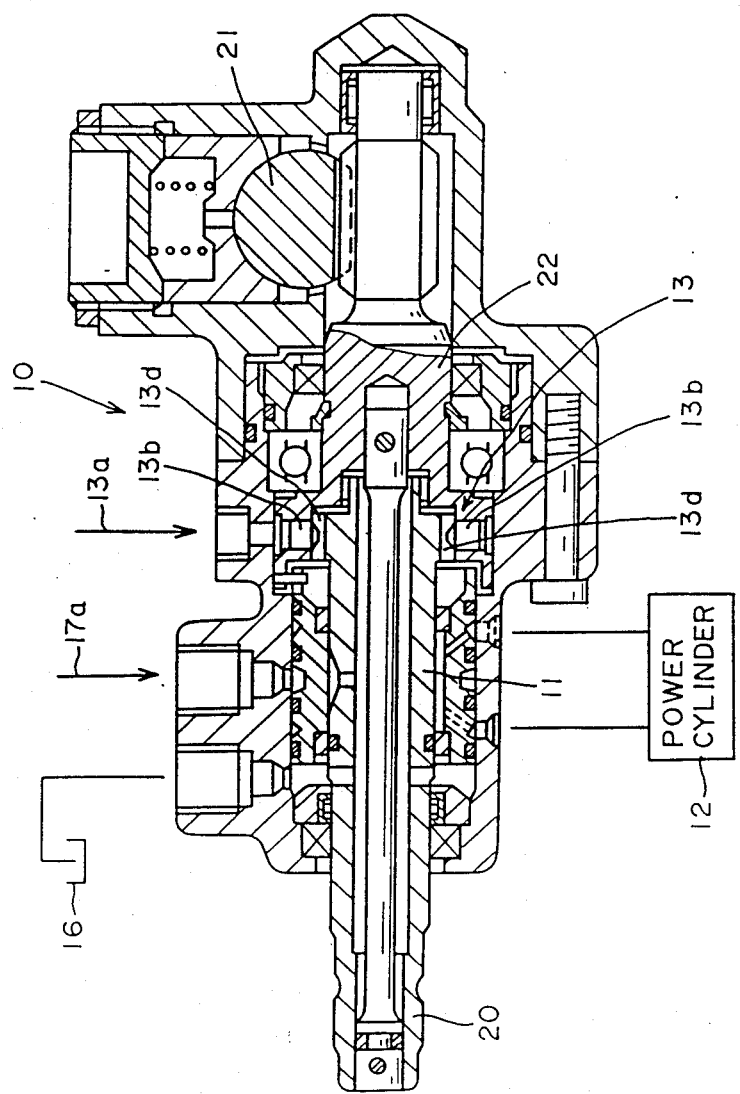
FIG. 2 is a cross-sectional view of a power steering mechanism.

Referring now FIGS. 1 and 2, there is shown a rack-pinion type power steering apparatus indicated generally at 10 which is composed of a servo valve 11 connected through a handle shaft 47 to a steering handle 46, a power cylinder 12 connected through an unillustrated link mechanism in a piston rod 21 to front wheels and a reaction mechanism incorporated into the servo valve 11.

A bypass valve 18 is built in a supply pump 15 such as a vane pump driven by an engine 41 of an automobile. With this arrangement, a working fluid having a constant flow rate Q is supplied via a discharge passage 17 to a flow distributing valve 14. This flow distributing valve 14 serves to distribute the working fluid having the constant flow rate Q to a servo valve passage 17a and to a reaction control passage 17b. In this case, the two streams of working fluid—one having a constant flow rate Q2 and the other having a constant flow rate Q2—are imparted to these passages 17a and 17b. The servo passage 17a is connected via the servo valve 11 to the power cylinder 12, while the reaction control passage 17b is connected to the reaction mechanism 13 and to an electromagnetic control valve 30.

The servo valve 11 involves the use of a well-known rotary type valve. This servo valve 11 is provided between the power cylinder 12 and a supply pump 15. The servo valve is operated immediately when undergoing manual steering torque applied from the steering handle 46 via the handle shaft 47 to an input shaft 20 of the servo valve 11. The servo valve 11 also serves to generate assist force by controlling the supply and discharge of the working fluid to and from two chambers of the power cylinder 12, whereby the incremented steering output torque is conveyed from the piston rod 21 of the power cylinder 12 to the front wheels. The already used working fluid is returned to a reservoir 16 where the fluid is sucked by the pump 15 once again.

The reaction mechanism 13 is essentially composed of: a plunger 13b fitted in a pair of insertion holes 13c formed in an output shaft 22 of the rotary type servo valve 11 and extend in the radial direction; and a V-shaped oblique surface 13d inclined to both sides of the peripheral direction, the oblique surface 13d being provided on the input shaft 20 to engage with the tip of the plunger 13b. This reaction mechanism 13 is arranged in such a way that a pressure of the working fluid introduced via a port 13a into the rear portion of the plunger 13b is varied by the electromagnetic control valve 30 with the result that torsion spring characteristics between the input shaft 20 and the output shaft 22 are changed, and working characteristics of the servo valve 11 with respect to the input torque, viz., the manual steering torque, are thereby varied to change the steering characteristics.

Tangible constructions and operations of the foregoing servo valve 11, the power cylinder 12 and the reaction mechanism 13 have been described in detail in U.S. patent application Ser. No. 06/865,337 which was assigned to the same assignee as the one of the present application. Such relevant description is therefore included in this application.

The above-described electromagnetic control valve 30 also has the same constitution as that of the control valve disclosed in U.S. patent application Ser. No. 06/865,337 now U.S. Pat. No. 4,763,745. This electromagnetic control valve 30 functions so that an amount of opening of a variable throttle is gradually diminished according as a value of electric current to be applied to a solenoid 36 thereof increases, and that a pressure of fluid which acts on the plunger 13b is increased. It is to be noted that the electromagnetic control valve 30 is provided with a fixed throttle which permits the predetermined amount of fluid to pass therethrough even when the variable throttle is completely closed.

In the above-described power steering apparatus, where the amount of opening (hereinafter simply referred to as opening) of the variable throttle of the electromagnetic control valve 30 is arranged to be small in proportion as the car speed increases, the manual steering torque characteristically, as depicted with a solid line in FIG. 3(A), becomes heavy in proportion to an increase in car speed, and similarly the same torque, as depicted with the solid line in FIG. 3(B), becomes heavy in proportion to an increase in steering angle. Under such control, however, even if the driving conditions such as aggressive driving or moderate driving or the road conditions on city streets or on mountain roads vary, the above-described characteristics remain invariable. In this embodiment, the opening of the electromagnetic control valve 30 is changed by an electronic control unit 50 illustrated in FIG. 1 in accordance with a road condition index which will be mentioned later and a correction driving index which is changed stepwise as well as the car speed, thereby changing the characteristics depending on the driving conditions and the road conditions.

As shown in FIG. 1, the electronic control unit 50 essentially consists of a microprocessor (hereinafter simply referred to as CPU) 51, a read-only memory (hereinafter simply referred to as ROM) 52 and a random access memory (hereinafter simply referred to as RAM) 53. The CPU 51 which is connected through a solenoid driving circuit 54 to a solenoid 36 of the electromagnetic control valve 30 performs a function to control the electric current applied to the solenoid 36. The CPU 51 is further connected through an unillustrated interface to a car speed sensor 40 and a steering angle sensor 45. The car speed sensor 40 is constituted by a tachometer linked to an output shaft 43 of a transmission 42 for transmitting the driving force of the engine 41 to the rear wheels 44, the tachometer serving to detect a car speed v on the basis of a frequency of a pulse signal generated from the car speed sensor 40. The steering angle sensor 45 consists of a rotary plate fixed to, for instance, the handle shaft 47, a pair of photo-interrupters and a phase judging circuit. This steering angle sensor 45 serving to detect a steering angle $\theta$ of the steering handle 46.

Figure 5A:
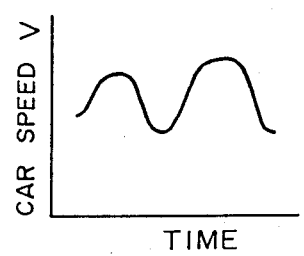
Figure 5B:
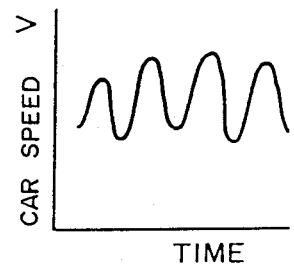
Figure 5C:
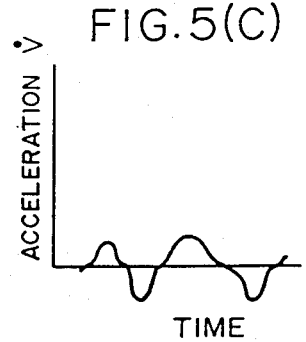
Figure 5D:
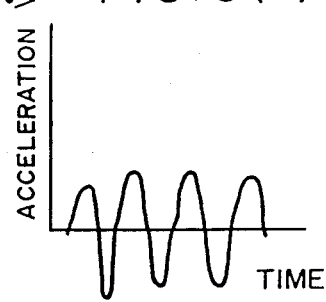
Figure 5E:
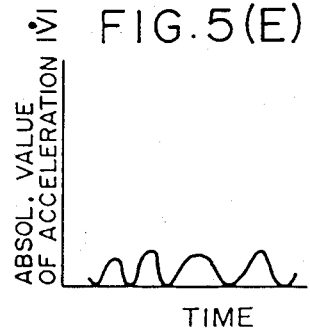
Figure 5F:
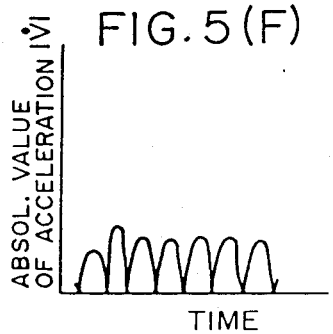

In the case of the moderate driving, a rate at which the car speed varies is, as illustrated in FIG. 5(A), relatively small. In the case of the aggressive driving, however, a rate at which the car speed varies is, as illustrated in FIG. 5(B), relatively large. Consequently, a variation curve of an acceleration v of the automobile, as shown in FIG. 5(C), depicts a small number of undulations with a small difference of height, whereas the variation curve in the case of the aggressive driving, as shown in FIG. 5(D), depicts more undulations with a large difference of height. An absolute value $|v|$ of the acceleration, as illustrated in FIG. 5(E), draws several undulations which are small in height in the case of the moderate driving. While on the other hand, the line of the absolute value, as illustrated in FIG. 5(F), assumes a large number of high undulations in the case of the aggressive driving. Consequently, where an integral value of the absolute value $|\dot{v}|$ of the acceleration within a given period is employed, as is or after slight modification, to serve as a driving condition index $J_1$, this index $J_1$ decreases in the moderate driving, whereas the index increases in the aggressive driving. From this phenomenon, it is possible to know whether the moderate driving or the aggressive driving is effected. In this embodiment, the driving condition index is, as depicted with the curve $J_1$ in FIG. 7, arranged to exactly follow the variations in integral value of the absolute value $|\dot{v}|$ of acceleration within the predetermined period in an increasing direction but is regulated so that the decreasing velocity does not exceed a predetermined speed in a decreasing direction. If the absolute value $|\dot{v}|$ of acceleration intensively changes at short cycles, the driving condition index $J_1$ is moderately varied to substantially approximate to the peak line of the absolute value of acceleration without causing sharp changes in the index $J_1$ due to the above-described step.

Correcting means for making a correction to permit the driving condition index $J_1$ to be moderately varied is provided. This correcting means converts the driving condition index which changes with respect to the time in such a manner as depicted with the curve $J_1$ in FIG. 7 into a reference value $J_{1b}$ which takes any one of three values $J_l$, $j_m$ and $j_h$ (the three values imply the numerical values 0, 50 and 99, respectively in this embodiment) based on three judgement levels L, M and H (three levels imply the numerical values 13, 38 and 57, respectively in this embodiment). Subsequent to this step, the correcting means further converts the reference value $J_{1b}$ into a correction driving condition index $J_{1a}$. Namely, the reference value is, as depicted with the polygonal line $J_{1b}$ in FIG. 7 (every portion except the inclined portions accords with the polygonal line $J_{1a}$ which exhibits the correction driving condition index), characterized such that: the driving condition index $J_1$ increases when the reference value takes $J_l$ and then shifts to $j_m$ when exceeding the judgement level M; the driving condition index $J_1$ increases (or decreases) when the reference value is $j_m$ and shifts to $j_h$ (or $J_l$) when it is greater than the judgement level H (or smaller than the level L); and the index $J_1$ decreases when the reference value is $j_h$ and shifts to $j_m$ when it is the judgement level M or less. The value of the correction driving condition index $J_{1a}$ is fundamentally identical with the reference value $J_{1b}$. When the reference value $J_{1b}$ is increased, the value of the index $J_{1a}$ immediately becoming equal to the reference value $J_{1b}$. Where the reference value $J_{1b}$ goes down, however, the value of the same index approximates to the reference value $J_{1b}$ at a given decreasing velocity and finally accords with this value. If there is a shift in the reference value $J_{1b}$, the driver is informed of this shift by a sound of buzzer in order to, as will be mentioned later, make a judgement corresponding to the value after the shift.

Next, the frequency of the steering angle will be described. The automobile encounters more intersections where it has to turn at a right angle but encounters less curvatures on the streets of cities. As a result, the steering frequency in a middle steering angle position is relatively small. On the occasion of travelling on the mountain roads, there are more curvatures but less orthogonal points, and hence the steering frequency in the middle steering angle position is relatively large. A frequency distribution of the absolute value $|\theta|$ of a steering angle $\theta$ within a predetermined period is created, and a value of frequency in the middle steering angle position K (corresponding to the travelling on the moderately curved roads) is obtained. Where a value obtained by dividing this frequency value by the total number of frequencies or a slightly modified value is employed as the road condition index $J_2$, this index $J_2$ becomes small in the case of travelling on the streets of cities shown in FIG. 6(B) but becomes large in the case of travelling on the mountain roads shown in FIG. 6(A). From this variation in the index $J_2$, it is possible to distinguish the conditions of the streets of cities from those of the mountain roads.

The ROM 52 stores control characteristics with respect to the car speed v and the steering angle $\theta$ of the control current applied to the solenoid 36 of the electromagnetic control valve 30. These control characteristics are, as shown in FIGS. 4(A) through 4(D), composed of four characteristic maps $A_1$, $A_2$, $A_3$ and $A_4$. The characteristic map $A_1$ exhibits variational characteristics of a first control current value $i_1$ to be applied to the solenoid 36 in accordance with variations in the car speed v and in the steering angle $\theta$ when the driving condition index $J_1=0$ ($=j_1$) (moderate driving condition) and the road condition index $J_2=0$ (travelling on the streets of cities where the automobile encounters few corners at the intersections). In the characteristic map $A_1$, the current value $i_1$ is set to increase at a specified rate within given ranges ($\theta_1 < \theta < \theta_2$, $v_1 < v < v_2$) with respect to increments in the car speed v and in the steering angle $\theta$ but is set so as not to vary beyond the abode-described ranges. The characteristic map $A_4$ shows variational characteristics of a fourth control current value $i_4$ to be applied to the solenoid 36 in accordance with the changes in the car speed v and in the steering angle $\theta$ when the driving condition index $J_1=99$ ($=j_h$) (aggressive driving condition) and the road condition index $J_2=99$ (travelling on the mountain roads having many curvatures). In this characteristic map $A_4$, the current value $i_4$ is set to increase in proportion to the increments in the car speed v and in the steering angle $\theta$ as in the case of the first control current value $i_1$ but is so set as to be considerably larger than this current value $i_1$ on the whole. The characteristic maps $A_2$ and $A_3$ respectively show the variational characteristics of a second control current value $i_2$ when $J_1=99$ and $J_2=0$ and of a third control current value $i_3$ when $J_1=0$ and $J_2=99$. In either case, the second and third control current values vary corresponding to the increments both in the car speed v and in the steering angle $\theta$ as in the case of the foregoing values $i_1$ and $i_4$. These values, however, fall within a range of $i_1$ to $i_4$.

The RAM 53 incorporates a multiplicity (N-pieces) of buffer registers $D_0$ to $D_{N-1}$ for computing the driving condition index $J_1$. The CPU 51 causes the buffer registers $D_0$ to $D_{N-1}$ to sequentially store the absolute values $|\dot{v}|$ of the acceleration $\dot{v}$ at predetermined time intervals T. In this case, the acceleration value $\dot{v}$ is given by:

$$\dot{v}=(v-\overline{O}v)/T\ldots \quad (1)$$

where $\overline{O}v$ is the car speed which has previously been read. Whenever the absolute value $|\dot{v}|$ is stored in the last buffer register $D_{N-1}$, the CPU 51 permits the first buffer register $D_0$ to launch into storage to update the contents of storage. The CPU 51 computes a sum of the values stored in the buffer registers $D_0$ to $D_{N-1}$, i.e., the integral value $J_1$ in conformity with the following equation (2).

$$J_1 = \sum_{n=0}^{N-1} D_n/K_1 \quad (2)$$

where $K_1$ is the constant (this constant is experimentally set to establish this relation $J_1 \div 99$ in the aggressive driving). In this case, the thus obtained integral value $J_1$ is defined as the driving condition index. A control program shown in the flowchart of FIG. 9 is prepared for effecting this kind of arithmetic, the control program being stored in the ROM 52. The CPU 51 converts the thus computed driving condition index $J_1$ into the correction driving condition index $J_{1a}$ which, as explained earlier, varies at the three levels. The control programs shown in the flowcharts of FIGS. 11(A) and 11(B) are prepared for performing this conversion, these programs being stored in the ROM 52.

The RAM 53 is equipped with a multiplicity (P-pieces) of buffer register $E_0$ to $E_{P-1}$ for the purpose of computing the road condition index $J_2$. The CPU 51 causes the buffer registers $E_0$ to $E_{P-1}$ to sequentially store the steering angles $\theta$ at the predetermined time intervals T. Every time the last buffer register $E_{P-1}$ has finished storing it, the CPU 51 permits the first buffer register $E_0$ to resume the storage to update the contents thereof. From the contents stored in the buffer registers $E_0$ to $E_{P-1}$ the CPU 51 computes a frequency F in a range except the steering angles $\theta$ which exhibit the vicinities of a neutral position (small steering angle position) and of a terminal position (large steering angle position), i.e., within the middle steering angle position K shown in FIGS. 6(A) and 6(B). The CPU 51 further computes the road condition index $J_2$ by the formula (3).

$$J_2=K_2\cdot F/P\ldots \quad (3)$$

where $K_2$ is the constant (the constant is experimentally set to establish this relation $J_2 \div 99$ in the mountain roads having many curvatures). The control program shown in the flowchart of FIG. 10 is prepared, this program being stored in the ROM 52.

Figure 4A:
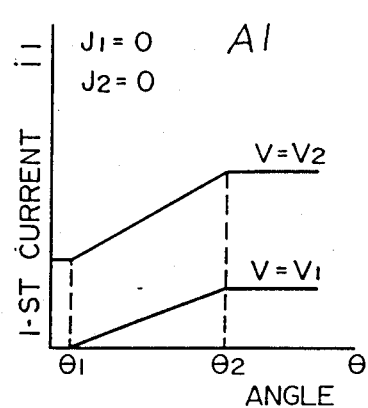
Figure 4B:
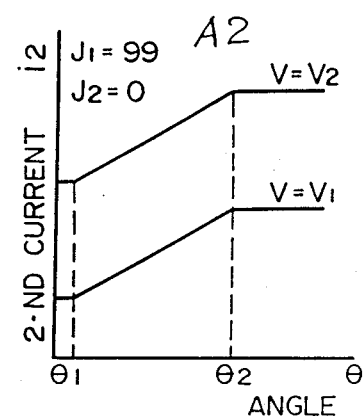

The CPU 51 fetches a first intermediate current value $I_1$ to be applied to the solenoid 36 of the electromagnetic control valve 30 in the case of travelling on the streets of cities from the first and second control current characteristic maps $A_1$ and $A_2$ shown in FIGS. 4(A) and 4(B) on the basis of the correction driving condition index $J_{1a}$ which varies at the three levels, the steering angle $\theta$ and the car speed at the present time. The CPU 51 similarly fetches a second intermediate current value $I_2$ to be applied to the electromagnetic control valve 30 when travelling on the mountain roads from the third and fourth control current characteristic maps $A_3$ and $A_4$ shown in FIGS. 4(C) and 4(D). Subsequent to this step, the CPU 51 inputs the road condition index $J_2$ and computes the control current value I which is so applied to the solenoid 36 as to correspond to the travelling condition at the present time from the first and second intermediate current values $I_1$ and $I_2$ by the following formula (4).

$$I=(I_2-I_1)\cdot J_2+I_1\ldots \quad (4)$$

The program shown in the flowchart of FIG. 12 is prepared for effecting this arithmetic, the program being stored in the ROM 52. In the next step, a control electric current having this value I is applied to the solenoid 36 of the electromagnetic control valve 30 by means of the CPU 51.

Where the two indices $J_{1a}$ and $J_2$ become large, the output control current value I applied to the solenoid 36 augments, and hence the opening of the electromagnetic control valve 30 is diminished. As a result, a pressure introduced into the reaction mechanism 13 grows, and the manual steering torque with respect to the car speed v and the steering angle $\theta$ are, as depicted with the broken lines in FIGS. 3(A) and 3(B), varied in the augmenting direction.

Next, operations of the first embodiment will hereinafter be described.

As illustrated in FIG. 8, the process executed by the CPU 51 is roughly classified into an arithmetic process I of the driving condition index $J_1$, an arithmetic process II of the road condition index $J_2$, and arithmetic process III in which the driving condition index $J_1$ is converted into the correction driving condition index $J_{1a}$, an arithmetic process IV of the output control current value I and a control current output process V. These processes are executed in due order.

Immediately when turning ON a main switch of the automobile, the electronic control unit 50 sets each variable to a predetermined initial value (for instance, the initial value of $J_{1b}$ is $j_m$). The car speed sensor 40 and the steering angle sensor 45 detect the car speed v and the steering angle $\theta$ which momentarily vary according to the condition under which the automobile travels. The values which have now been detected are individually stored in registers (not illustrated). The CPU 51 executes a series of processes based on the control programs every time interruption signals are inputted at every preset time interval T (for instance, 0.5 second) from a block generation circuit 55.

(I) Arithmetic Process of the Driving Condition Index $J_1$

To start with, the CPU 51 reads the car speed v stored in the above-described present value register in a step 101 shown in FIG. 9, and computes the acceleration v by differentiating the car speed v in accordance with the formula (1) in the next step 102.

In the subsequent step 103, the CPU 51 compares a sampling counter value n with the number N of the buffer registers $D_0$ to $D_{N-1}$. If $n \geq N$ is not valid, the CPU executes nothing at this moment. If $n \geq N$ is valid, however, the CPU 51 causes the n th buffer register $D_n$ to store the absolute value $|\dot{v}|$ of acceleration in a step 105, after resetting the sampling counter value n to 0 in a step 104. The CPU 51 permits the N-pieces of buffer registers $D_0$ to $D_{N-1}$ to sequentially store the detected absolute values $|\dot{v}|$ of acceleration at the predetermined time intervals T in the steps 103 through 105. The CPU 51 also operates to cause the first buffer register to sequentially update the contents of storage for every cycle of all the buffer registers. Owing to this updating process, the N-pieces of absolute values $|\dot{v}|$ of acceleration during a period of the latest predetermined time $T \times N$ are stored in the buffer registers $D_0$ to $D_{N-1}$.

In a step 106, the CPU 51 reads out the contents stored in all the buffer registers $D_0$ to $D_{N-1}$ and then computes the driving condition index $J_1$ by the formula (2). Thereafter, the CPU 51 moves to the arithmetic operation II of the road condition index $J_2$.

(II) Arithmetic Process of the Road Condition index $J_2$

To begin with, the CPU 51 reads the steering angle $\theta$ stored in the present value register in a step 111 shown in FIG. 10 and further makes the p-th buffer register $E_p$ store the absolute value $|\theta|$ of steering angle in a step 112. The CPU 51 sequentially modifies addresses of the buffer registers $E_0$ to $E_{P-1}$ every time it reads the steering angles $\theta$ from the present value register, whereby the predetermined number of the latest absolute values $|\theta|$ of steering angle are stored in the buffer registers $E_0$ to $E_{P-1}$. The CPU 51 subsequently sets a frequency counter value F to 0 in a step 113, and further sets a value obtained by subtracting 1 from a number P of the buffer registers, this value being defined as an initial value of a readout counter value H in a step 114.

The CPU 51 compares values of the H-th buffer register $E_H$ with two set values B and C in a step 115. The set values B and C are, as shown in FIGS. 6(A) and 6(B), defined as the upper and lower limit values of the absolute value within a range of the middle steering angle position corresponding to the moderately curvilinear travelling. The CPU 51 adds 1 to the frequency counter value F in a step 116 when $B \leq E_H \leq C$. If $B \leq E_H \leq C$ is not valid, the CPU 51 moves directly to a step 117 to subtract 1 from a readout counter value H. The CPU 51 compares the readout counter value H with 0 in a step 118, and repeats the processes described in the steps 115 through 117 till obtaining such a relation as $H < 0$. Then the frequency counter value F is arranged to be the number of steering operations which will satisfy $B \leq E_P \leq C$ in the buffer registers $E_0$ to $E_{P-1}$. When $H < 0$, the CPU 51 moves to the next step 119.

In the step 119, the CPU 51 computes the road condition index $J_2$ by the formula (3) and then comes to the next arithmetic process III relative to the correction driving condition index $J_{1a}$.

(III) Arithmetic Process of the Correction Driving Condition Index $J_{1a}$

Figure 11:
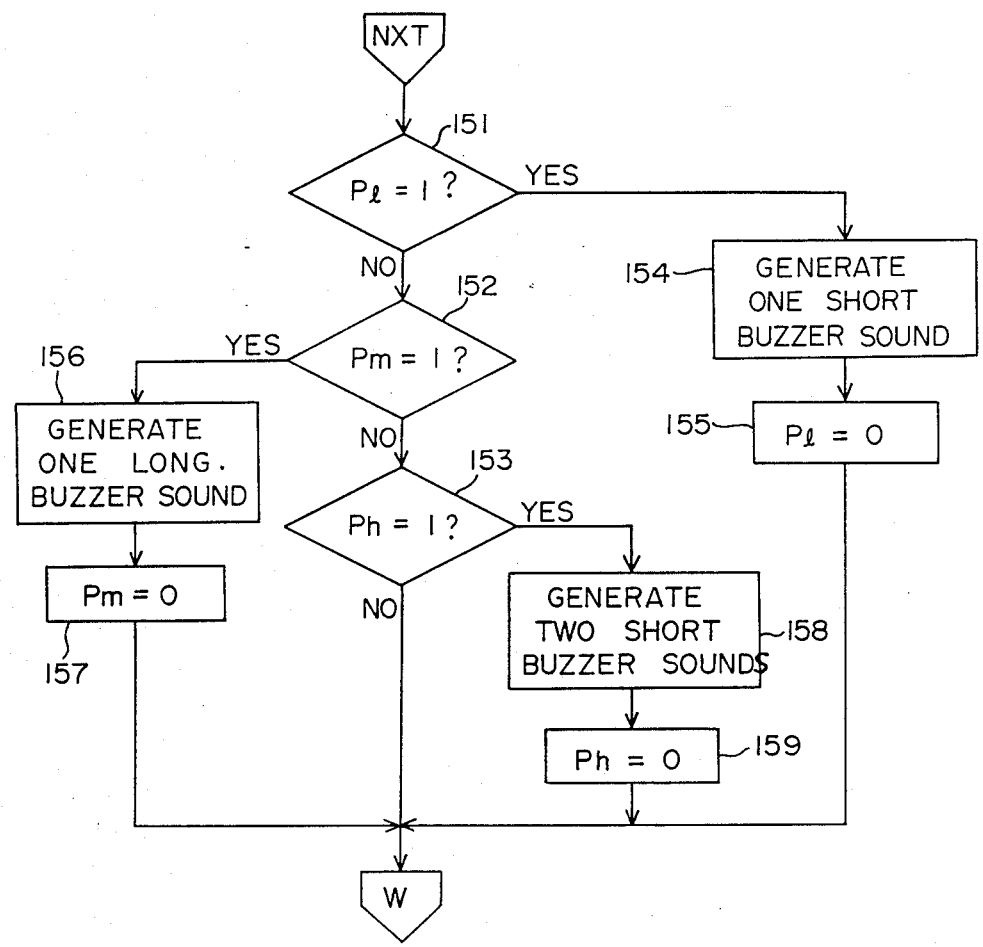

In the flowchart of FIG. 11 (A), if $J_{1b} = j_l$ and $J_1 < M$, the CPU 51 goes through steps 121 and 122, and will execute the process shown in a step 141. If $J_{1b} = j_l$ and $J_1 \geq M$, the CPU 51 goes through the steps 121 and 122, and converts the reference value $J_{1b}$ into $j_m$ in a step 127. In the wake of this step, the CPU 51 sets a flag $P_m$ to 1 in a step 128 and will perform the process shown in a step 141. If $J_{1b} \neq j_l$, $J_{1b} = j_m$, $J_1 < H$ and $J_1 \geq L$, the CPU 51 passes through steps 121 and 123 to 125, and puts the process forward to a step 141. If $J_{1b} \neq j_l$, $J_{1b} = j_m$, $J_1 < H$ and $J_1 < L$, the CPU 51 goes through the steps 121 and 123 to 125, and converts the reference value $J_{1b}$ into $j_l$ in a step 129. After setting a flag $P_l$ to 1 in a step 130, the CPU 51 puts the process forward to a step 141. If $J_{1b} \neq j_l$, $J_{1b} = j_m$ and $J_1 \geq H$, the CPU 51 goes through the steps 121, 123 and 124 and converts the reference value $J_{1b}$ into $j_h$ in a step 131. After setting a flag $P_h$ to 1 in a step 132, the CPU 51 will execute the process of a step 141. If $J_{1b} \neq j_l$, $J_{1b} \neq j_m$, and $J_1 > M$, the CPU 51 passes through the steps 121, 123 and 126, and moves directly to the step 141. If $J_{1b} \neq j_l$, $J_{1b} \neq j_m$ and $J_1 \leq M$, the CPU 51 passes through the steps 121, 123 and 126, and converts the reference value $J_{1b}$ into $j_m$ in a step 133. After setting the flag $P_m$ to 1 in a step 134, the CPU 51 moves the process forward to the step 141. To summarize the processes of the above described steps 121 through 134, the CPU 51 maintains the reference value $J_{1b}$ when the fluctuations in the driving condition index $J_1$ fall within a predetermined range. If such fluctuations go beyond the predetermined range, the CPU 51 shifts the reference value $J_{1b}$ to any one of the three level values $j_l$, $j_m$ and $j_h$. In the latter case, the CPU 51 puts the process forward to the step 141 after setting the flag corresponding to the new reference value $J_{1b}$ to 1.

In the step 141, the CPU 51 compares the correction driving condition index $J_{1a}$ with the reference value $J_{1b}$. If $J_{1a} \leq J_{1b}$, the CPU 51 operates to establish such a relation as $J_{1a} = J_{1b}$. Thereafter, if $J_{1a} > J_{1b}$, the CPU 51 operates to obtain this relation $J_{1a} = J_{1b} - 1$ in a step 143, and will subsequently execute the process of a step 151. In the steps 141 through 143, when the reference value $J_{1b}$ increases, the CPU 51 causes a value of the correction driving condition index $J_{1a}$ to immediately become the new reference value $J_{1b}$. When the reference value $J_{1b}$ decreases, the CPU 51 makes the value of the correction driving condition index $J_{1a}$ reduce down to the new reference value $J_{1b}$ at a constant velocity.

In steps 151 through 159, the CPU 51 operates to sound a buzzer once for a short while in the step 154, if $P_l = 1$. The CPU 51 resets a flag $P_l$ to 0 in the step 155. If $P_m = 1$, the CPU 51 operates to sound the buzzer once for a long time in the step 156, and resets the flag $P_m$ to 0 in the step 157. If $P_h = 1$, the CPU 51 operates to sound the buzzer twice shortly in the step 158, and resets the flag $P_h$ to 0 in the step 159. Where each of the flags $P_l$, $P_m$ and $P_h$ is 0, the CPU 51 moves to the next arithmetic process IV of the control current I. In the above-described steps 151 through 159, the CPU 51 sounds the buzzer to correspond to a situation after the steering characteristics have bee varied. Where steering force is reduced, as explained earlier, the steering characteristics slowly change, at which time the buzzer sounds at the beginning of the variation.

(IV) Arithmetic Process of the Control Current Value I

At the first onset, in a step 161 the CPU 51 searches a first control current value $i_1$ from the first control current characteristic map $A_1$ in the ROM 52 on the basis of the present car speed v and the steering angle $\theta$ which have been read in the steps 101 and 111. In a step 162 the CPU 51 likewise searches a second control value $i_2$ from the second control current characteristic map $A_2$ on the basis of the car speed v and the steering angle $\theta$. In the subsequent step 163 the CPU 51 effects interpolation arithmetic of a first intermediate current value $I_1$ by substituting the first and second control current values $i_1$ and $i_2$ and the correction driving condition index $J_{1a}$ computed in the arithmetic process III into the following formula.

$$I_1 = (i_2 - i_1) \cdot J_{1a} + i_1$$

This first intermediate current value $I_1$ is defined as a control current value suitable for being so applied to the electromagnetic control valve 30 as to correspond to the present car speed, the steering angle and the driving conditions as well in the case of the streets of cities having less curvatures.

In the following steps 164 through 166, the CPU 51 searches third and fourth control current values $i_3$ and $i_4$ from the third and fourth control current characteristic maps $A_3$ and $A_4$ on the basis of the present car speed v and the steering angle $\theta$. Then the CPU 51 effects interpolation arithmetic of a second intermediate current value $I_2$ by substituting the third and fourth control current values $i_3$ and $i_4$ and the correction driving condition index $J_{1a}$ into the following formula.

$$I_2 = (i_4 - i_3) \cdot J_{1a} + i_3$$

This second intermediate current value $I_2$ is defined as a control current value suitable for being so applied to the electromagnetic control valve 30 as to correspond to the present car speed, the steering angle and the driving conditions in the case of mountain roads having a good number of curvatures.

In a step 167 the CPU 51 computes the output control current value I by substituting the intermediate current values $I_1$ and $I_2$ and the road condition index $J_2$ obtained in the arithmetic process II into the foregoing formula (4). Subsequently, the CPU 51 moves to the next arithmetic process V. The output control current value I is a value appropriate for being applied to the electromagnetic control valve 30, corresponding to the present car speed, the steering angle, the driving conditions and the road conditions.

(VI) Control Current Output Process

In the control current output process V shown in FIG. 8, the CPU 51 operates to apply the output control current value I computed in the step 167 to the solenoid 36 of the electromagnetic control valve 30. Upon a completion of this process V, the CPU 51 executes all the programs shown in the flowcharts of FIGS. 8 to 12.

Whenever the interruption signals are outputted at every predetermined short time interval T, the CPU 51 repeatedly executes the programs described in the foregoing flowcharts, and further sets the opening of the electromagnetic control valve 30 in the optimum state in accordance with the car speed, the steering angle, the driving conditions and the road conditions. With this arrangement, it is feasible to acquire the optimum manual steering torque by changing over the steering characteristics. Consequently, the assist force of the power steering apparatus is reduced, when the correction driving condition index $J_{1a}$ and the road condition index $J_2$ become large. A rate of increase in the manual steering torque to the car speed and the steering angle, as depicted with the broken lines in FIGS. 3(A) and 3(B), varies in the increasing direction in proportion to increments in the above-described indices $J_1$ and $J_2$.

As described above, even if the driving condition index $J_1$ frequently fluctuates, the correction driving condition index $J_{1a}$ remains constant on the condition that the fluctuations fall within the predetermined range. Hence, there will be no variation in steering force which is to be caused by the change-over of the steering characteristics, thereby giving no unnatural feeling to the driver.

In the first embodiment, where the automobile travels on a superhighway at a substantially constant speed, the correction driving condition index $J_{1a}$ becomes $j_l$ and such a steering characteristic wherein the manual steering torque is small is present because of the road condition index $J_2$ being small. Under such circumstances, when making an attempt to outrun the preceding car which travels slowly by performing a lane change with no acceleration, the manual steering torque required for the lane change is extremely small, which probably gives uneasiness to the driver. A second embodiment of the present invention which obviates such a problem will hereinafter be described. Some points different from the first embodiment are shown in FIGS. 13 and 14.

In the second embodiment, the correcting means for moderately varying the driving condition index $J_1$ consists of first and second correcting means. As in the case of the first embodiment, the first correcting means at first converts the driving condition index $J_1$ into an intermediate correction index $J_{1c}$ which changes at the three levels, this intermediate correction index being virtually equal to the above-described reference value $J_{1b}$. FIG. 13 (a) shows a situation in which the intermediate correction index $J_{1c}$ changes. The second correcting means converts the intermediate correction index $J_{1c}$ into the correction driving condition index $J_{1a}$ which takes the value $j_m$ higher than the intermediate correction index $J_{1c}$ by one level when the car speed v exceeds a set value $V_0$ (equivalent to an ordinary travelling velocity on the superhighway) and a value of the intermediate correction index $J_{1c}$ is $j_l$ in such a case that a lateral acceleration G shown in FIG. 13(b) goes beyond a specified range, viz., a range of $\pm\alpha$, and also takes a value of the intermediate correction index $J_{1c}$ in other cases.

Namely, the CPU 51 computes the lateral acceleration G by substituting the car speed v and the steering angle $\theta$ as shown in the formula (5).

$$G = \theta \cdot v^2 \tag{5}$$

When $-\alpha \leq G \leq \alpha$, viz., at timings $g_3$, $g_4$ and $g_5$ shown in FIG. 13(b), the correction driving condition index $J_{1a}$, as illustrated in FIG. 13(c), comes to $j_m$ which is one level higher than the value $j_l$ of the intermediate correction index $J_{1c}$. Such a relation as $-\alpha \leq G \leq \alpha$ is valid at the timings $g_1$ and $g_2$, however, $J_{1c} \geq j_m$ is also established. Hence, the value of the correction driving condition index $J_{1a}$ remains to be a value of the intermediate correction index $J_{1c}$. It is to be noted that FIG. 13 is given under a condition in which $v \geq V_0$ is invariably maintained. As in the case of the first embodiment, the correction driving condition index $J_{1a}$ exhibits the feature that it increases immediately but decreases at the constant velocity. FIG. 14 is a flowchart which should be added to the flowchart of FIG. 11(A) used in the first embodiment, this additional flowchart serving to explain the operations of the second embodiment. The control program shown in the flowchart of FIG. 14 is stored in the ROM 52. It should be noted that the above-mentioned value $\alpha$ is a value corresponding to the lateral acceleration which does not reach it when slightly correcting a position of the steering handle while travelling on the superhighway but exceeds it when performing the steering operation for the lane change.

Next, some operations of the second embodiment which differ from those of the first embodiment will be mentioned.

The operation executed by the CPU 51 is, as shown in FIG. 8, roughly classified into the arithmetic processes I, II, II and IV and the control current output process V. Excepting the arithmetic process III of the correction driving condition index $J_{1a}$, the rest are much the same as those of the first embodiment. However, the steps 135 through 139 shown in FIG. 14 are added prior to the step 141 in the flowchart of FIG. 11(A) in order to carry out the arithmetic process III of the correction driving condition index $J_{1a}$.

For performing arithmetic of the correction driving condition index $J_{1a}$ in steps which are virtually the same as the above-mentioned steps 121 through 134, the CPU 51 firstly holds a value of the intermediate correction index $J_{1c}$ (corresponding to the reference value $J_{1b}$ in the first embodiment) as it is when the fluctuations in the driving condition index $J_1$ fall within the predetermined range. The CPU 51 converts the value of the intermediate correction index $J_{1c}$ into any one of the three level values $j_l$, $j_m$ and $j_h$ when such fluctuations exceed the predetermined range. In the case of varying the intermediate correction index $J_{1c}$, the flag corresponding to a value of the new intermediate correction index $J_{1c}$ is set to 1. After this operation, the CPU 51 moves the process forward to the step 135 shown in FIG. 14.

In the step 135, the CPU 51 compares the car speed v with the set value $V_0$. If $v < V_0$, the CPU 51 moves to the step 141. If $v \geq V_0$, the CPU 51 proceeds to the step 136 in which the lateral acceleration G is computed by the formula (5). In the following step 137, the CPU 51 makes a comparison between the intermediate correction index $J_{1c}$ which takes the three level values and the minimum value $j_l$. If $J_{1c} \neq j_l$, the CPU 51 proceeds directly to the step 141. If $J_{1c} = j_l$, the process is further moved to the step 138 where the CPU 51 compares an absolute value $|G|$ of the lateral acceleration G with the preset value $\alpha$. If $|G| \leq \alpha$, the process remains as it is. If $|G| > \alpha$, the CPU 51 operates to permit the intermediate correction index $J_{1c}$ to take $j_m$. Then CPU 51 proceeds to the step 141.

In steps identical with the steps 141 to 143 of the first embodiment, the CPU 51 operates to cause a value of the correction driving condition index $J_{1a}$ to immediately come to $J_{1c}$ when the intermediate correction index $J_{1c}$ increments but cause the value of the index $J_{1a}$ to decrease down to $J_{1c}$ at the constant velocity when the intermediate correction index $J_{1c}$ diminishes. The CPU 51 subsequently performs a function to sound the buzzer which indicates a state after the steering characteristics have been varied in steps which are the same as the steps 151 through 159 of the first embodiment. Then the CPU 51 moves to the next arithmetic process IV of the control current value I.

In the second embodiment, the manual steering torque becomes relatively small when unconsciously effecting slight correction of the steering angle during the travelling on the superhighway but adequately increases when consciously carrying out the lane change to outrun the preceding car. This increase in manual steering torque provides some responsive force to the driver, and the driver therefore feels no uneasiness.

In the second embodiment, the lateral acceleration is computed on the basis of the car speed and the steering angle. It is, however, possible to perform the same control by directly detecting the lateral acceleration by means of an accelerometer. A variation of the second embodiment may be arranged such that a map based on the steering angle and the car speed is created, and the correction driving condition index is made to increase by one level or more when exceeding a certain range on this map. Alternatively, if the steering angle is greater than the predetermined value, the correction driving index may increase by one level or more.

In each of the above-described embodiments, the correction driving condition index $J_{1a}$ is arranged to increase immediately but decrease at the constant velocity. As a result, the manual steering torque proportionally grows at once when the driver increasingly tenses and aggressive driving is thereby created. In contrast with this situation, when the tension is slackened and the driving gets moderate, the manual steering torque slowly diminishes. Hence, the fluctuations in manual steering torque by a change-over of the steering characteristics appear to be more natural. In the respective embodiments, the driver is informed of the change-over of the steering characteristics by a sound of buzzer, so that the driver is able to enjoy the variations in steering force without anxiety.

In the above-described embodiments, the control current values $i_1$ to $i_4$ are taken out of the characteristic maps $A_1$ through $A_4$ illustrated in FIGS. 4(A) through 4(D) on the basis of the car speed v and the steering angle $\alpha$. However, these control current values $i_1$ to $i_4$ can be fetched from the characteristic maps on the basis of the car speed alone. In this case, the control current values corresponding to a variety of car speeds are set in the characteristic maps shown in FIGS. 4(A) through 4(D).

Figure 4C:
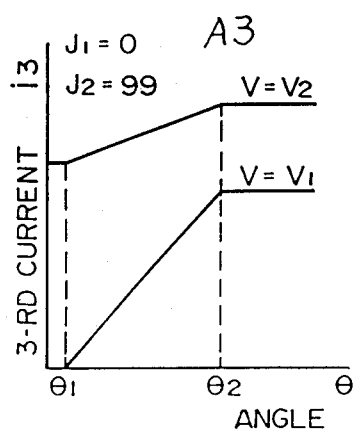
Figure 4D:
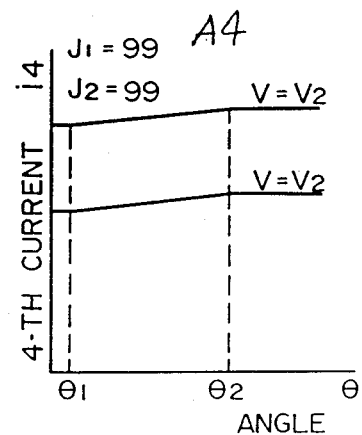

FIG. 15 shows a program used instead of the one shown in FIG. 12. According to this program, the control current values $i_1$ and $i_3$ read from the maps $A_1$ and $A_3$ shown in FIGS. 4(A) and 4(C) are computed, and a first intermediate current value $I_1$ is also computed on the basis of the road condition index $J_2$ (step 163a). Moreover, there are computed the control current values $i_2$ and $i_4$ read from the maps $A_2$ and $A_4$ shown in FIGS. 4(B) and 4(D), and a second intermediate current value $I_2$ is also computed on the basis of the road condition index $J_2$ (step 166a). Then the output control current value I is computed on the basis of the first and second intermediate values $I_1$ and $I_2$ as well as the correction driving condition index $J_{1a}$.

Any one of output signals from an engine rotational speed sensor 76 depicted in FIG. 16, a valve position sensor 81 illustrated in FIG. 17 and an intake air volume sensor 91 shown in FIG. 18 can be utilized instead of a car speed signal in the above-described embodiment. The outputs of these sensors 76, 81 and 91 are defined as signals relative to the car speed which varies in company with the variations in the car speed v. A signal is, as illustrated in FIG. 16, transmitted from an igniter 70 to the engine rotational speed sensor 76. The igniter 70 is driven through a pick-up coil 71 by a signaling rotor 72 mounted on a cam shaft. The igniter 70 selectively ignites a multiplicity of spark plugs 75 through intermediary of an ignition coil 73 and a distributor 74. A throttle valve position sensor 81 illustrated in FIG. 17 is mechanically connected to a throttle valve 80 to detect the opening of this valve 80 provided in a fuel gas passage 61. The throttle valve 80 regulates an amount of the fuel gas supplied to an engine 47. The intake air volume sensor 91 depicted in FIG. 18 is mechanically connected to an air flow meter 90 provided in an intake air passage 61 of an electronic control fuel injection system (this system is known as EFI).

In the above-mentioned embodiments, the four control current values $i_1$ through $i_4$ are read from the characteristic maps $A_1$ to $A_4$ stored in the ROM 52. The present invention is not, however, confined to the use of such characteristic maps $A_1$ through $A_4$. Namely, the ROM 52 is arranged to store one or more calculating equations (preferably, four equations corresponding to the four maps $A_1$ to $A_4$); and the four control current values $i_1$ through $i_4$ corresponding to the car speed signals at that time or to both the car speed signals and the steering angle signals are computed according to these equations.

In the above-described embodiments, the reference value $J_{1b}$ of the driving condition index is, as shown in the steps 121 to 134 of FIG. 11(A), changed over in a little bit complicated manner. In this manner, the reference value $J_{1b}$ is kept constant when a magnitude of variation falls within the predetermined range even if the driving condition index $J_1$ changes repeatedly in the vicinities of the judgement levels L, M and H. However, the reference value $J_{1b}$ may be varied in a much simpler manner every time the value of the driving condition index $J_1$ passes through the individual judgement levels L, M and H. With this arrangement, it is also feasible to reduce the frequency of changing over the steering characteristics.

As many widely different embodiments of this invention may be made without departing from the spirit and scope thereof, it is to be understood that the invention is not limited to the specific embodiments thereof except as defined in the appended claims.

What is claimed is:

1. A device for controlling steering force in a power steering apparatus including an electromagnetic control valve for varying characteristics between manual steering torque and steering output torque by changing an amount of opening thereof in accordance with a control current to be applied, said device comprising:

a car speed sensor means for detecting a car speed or information varying in connection with said car speed;

a steering angle sensor for detecting a steering angle;

first arithmetic means for calculating a driving condition index corresponding to a driving condition determined by a driver on the basis of said information transmitted from said car speed sensor;

second arithmetic means for calculating a road condition index corresponding to a road condition on the basis of said steering angle transmitted from said steering angle sensor;

correcting means for modifying said driving condition index to form a correction driving condition index which takes any one of a plurality of discrete values which change stepwise depending upon the particular range of values to which said driving index belongs;

control current arithmetic means for calculating an output current value on the basis of said correction driving condition index and said road condition index; and controlling means for applying said output control current having a value computed by said control current arithmetic means to said electromagnetic valve.

2. A device for controlling steering force in a power steering apparatus according to claim 1, said device further comprising a indicating means for indicating to said driver when a change has occurred from one of said plurality of discrete values of said correction driving index to another of said plurality of discrete values.

3. A device for controlling steering force in a power steering apparatus as set forth in claim 1, wherein said correcting means is composed of first correcting means for converting said driving condition index onto an intermediate correction index which takes any one of said plurality of discrete values in accordance with said particular range of values and second correcting means for converting said intermediate correction index into said correction driving condition index which takes a value equal to said intermediate correction index when an arithmetic result arithmetically obtained by employing variable including said steering angle falls within a predetermined range and also takes a value which is at least one level higher than said intermediate correction index when said arithmetic result goes beyond said predetermined range.

4. A device for controlling steering force in a power steering apparatus as set forth in claim 1, wherein said correcting means is composed of first correcting means for converting said driving condition index into an intermediate correction index which takes any one of said plurality of discrete values in accordance with a value of said driving condition index and second correcting means for converting said intermediate correction index into said correction driving condition index which takes a value equal to said intermediate correction index when an absolute value of lateral acceleration is smaller than a predetermined value and also takes a value which is at least one level higher than said intermediate correction index when said absolute value of said lateral acceleration is greater than said predetermined value.

5. A device for controlling steering force in a power steering apparatus as set forth in claim 1, wherein said control current arithmetic means comprises: storage means for storing at least four control current characteristics which define a variety of control current values so as to correspond to various car speed with respect to at least four travelling conditions so that a first driving condition, a second driving condition, a first road condition and a second road condition are combined; control current fetching means for fetching one of said control current values corresponding to said signal transmitted from said car speed sensor in accordance with each of at least said four control current characteristics; and third arithmetic means for computing said output control current value on the basis of at least said four control current values which have been fetched in accordance with each of said control current characteristics, said road condition index computed by said second arithmetic means and said correction driving condition index computed by said correcting means.

6. A device for controlling steering force in a power steering apparatus as set forth in claim 5, wherein said at least four control current characteristics stored in said storage means comprises: a first characteristic control map which describes a variety of control current values corresponding to various car speed information, said first characteristic control map being used when performing moderate driving on roads having less curvatures as in the cities; a second characteristic control map which describes said variety of control current values corresponding to said various car speed information, said second characteristic control map being used when performing aggressive driving on the roads having less curvatures as in the cities; a third characteristic control map which describes said variety of control current values corresponding to said various car speed information, said fourth characteristic control map being used when performing the moderate driving on the roads having many curvatures as in the mountains; and a fourth characteristic control map which describes said variety of control current values corresponding to said various car speed information, said third characteristic control map being used when performing the aggressive driving on the roads having many curvatures as in the mountains.

7. A device for controlling steering force in a power steering apparatus as set forth in claim 6, wherein said third arithmetic means comprises: first current computing means for obtaining a first intermediate current value on the basis of said correction driving condition index computed by said correcting means and a first and second of said control current values read from said first and second characteristic control maps; second intermediate current computing means for obtaining a second intermediate current value on the basis of said correction driving condition index computed by said correcting means and a third and fourth of said control current values read from said third and fourth characteristic control maps; and output current computing means for computing said output current value on the basis of said road condition index computed by said second arithmetic means and said first and second intermediate current values.

8. A device for controlling steering force in a power steering apparatus as set forth in claim 6, wherein said third arithmetic means comprises: first current computing means for obtaining a first intermediate current value on the basis of said road condition index computed by said second arithmetic means and a first and third of said control current values read from said first and third characteristic control maps; said current computing means for obtaining a second intermediate current value on the basis of said road condition index computed by said second arithmetic means and a second and fourth of said control current values read from said second and fourth characteristic control maps; and output current computing means for computing said output current value on the basis of said correction driving condition index computed by said first arithmetic means and said first and second intermediate current values.

9. A device for controlling steering force in a power steering apparatus as set forth in claim 6, wherein said variety of control current values are defined so as to correspond to not only said various car speed information but also various steering angles provided in each of said first, second, third and fourth characteristic control maps stored in said storage means, and wherein said control current fetching means operates to fetch one of said control current values corresponding to said car speed information and to said steering angle signal from each of said first, second, third and fourth characteristic control maps.

10. A device for controlling steering force in a power steering apparatus as set forth in claim 1, wherein said first arithmetic means comprises: reading means for reading information outputted from said car speed sensor at a predetermined interval; acceleration computing means for obtaining acceleration by differentiating said information read by said reading means; absolute value computing means for obtaining a absolute value of said acceleration obtained by said acceleration computing means; storage updating means for storing a predetermined number of update absolute values of said acceleration in an updating manner which are obtained by said absolute value computing means; and index computing means for obtaining said driving condition index by integrating said predetermined number of absolute values of said acceleration stored in said storage updating means.

11. A device for controlling steering force in a power steering apparatus as set forth in claim 1, wherein said second arithmetic means comprises: reading means for reading said steering angle signal outputted from said steering angle sensor at a predetermined interval; absolute value computing means for obtaining an absolute value of said steering angle signal read by said another reading means; storage updating means for storing a predetermined number of update absolute values of said steering angle signals in an updating manner which are obtained by said absolute value computing means; count means for obtaining the number of said absolute values which fall within a predetermined range among said predetermined number of absolute values stored in said another storage updating means; and index computing means for obtaining said road condition index on the basis of said number of said absolute values obtained by said count means and said predetermined number of said absolute values of said steering angle signals stored in said storage updating means.

* * * * *